Patented Apr. 17, 1928.

1,666,708

UNITED STATES PATENT OFFICE.

ERNST KUSS, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF PARAFORMALDEHYDE.

No Drawing. Application filed June 18, 1926, Serial No. 116,947, and in Germany June 24, 1925.

Paraformaldehyde has hitherto been prepared by concentrating dilute formaldehyde solutions or by treating such solutions with sulfuric acid. Both processes have the great disadvantage of the products being obtained with a rather small yield and often being only difficultly soluble (especially when obtained by the second process referred to above) which is undesirable in the most cases.

I have now found that paraformaldehyde can be obtained in a readily soluble form and with a good yield by preparing formaldehyde by catalytically oxidizing of methanol substantially free from water, preferably methanol of at least 98 per cent strength as completely as possible to formaldehyde, condensing the resulting mixture of vapors and gases by cooling preferably to about 30° C, and concentrating the resulting liquid by contact with the uncondensed gases while slightly heating it. Thereby formaldehyde solutions of about 60 per cent strength are obtained which gradually form a rather solid tallow-like mass of paraformaldehyde. As at room temperature the formation of paraformaldehyde takes several hours for completion, the highly concentrated solution can be filled without difficulty in the mobile state into containers for storage or shipment and the like, and solidifies in these containers. Or the solution or paste of paraformaldehyde may be further desiccated in a vacuum evaporator whereby a dry powdery product is obtained.

The gases not condensed by the moderate cooling of the reaction mixture contain besides nitrogen, in case the oxidation is carried out with air, and occasionally some methyl alcohol, also formaldehyde which is suitably worked up to a formaldehyde solution of 30 per cent strength.

The following example will further illustrate how my invention may be carried out in practice, but the invention is not limited to this example.

A mixture of vapors of methanol of 99.5 per cent strength with so much air as to effect a complete or nearly complete oxidation of the alcohol to formaldehyde is continuously passed at a temperature of at least 500° C. over silver as catalyst. The resulting gas mixture is rapidly cooled to about 30° C. and the condensed liquid while being slightly heated, passed through a long pipe, for instance a coil, to the discharge opening. The uncondensed gases pass the same way and concentrate the formaldehyde solution, so that it runs off with a strength of 60 per cent. After standing for a short time, ample quantities of paraformaldehyde separate from this solution so that finally a tallow-like mass is formed. From each kilogram of methanol, about 800 grammes of paraformaldehyde of 60 per cent strength are obtained in this manner.

I claim:

1. The process of manufacturing paraformaldehyde which consists in catalytically oxidizing methanol substantially free from water practically completely to formaldehyde by means of an oxygen-containing gas, cooling the reaction gases so as to condense a mixture of formaldehyde and water vapor and concentrating the resulting liquid by means of the uncondensed gases and allowing the resulting concentrated solution to solidify.

2. The process of manufacturing paraformaldehyde which consists in catalytically oxidizing methanol substantially free from water practically completely to formaldehyde by means of an oxygen-containing gas, cooling the reaction gases so as to condense a mixture of formaldehyde and water vapor and concentrating the resulting liquid by means of the uncondensed gases, allowing the product to solidify to a tallow-like mass and converting it into a dry powder by means of heat and a vacuum.

In testimony whereof I have hereunto set my hand.

ERNEST KUSS.